No. 675,256. Patented May 28, 1901.
F. F. WEILENMAN.
DUST PAN.
(Application filed Sept. 27, 1900.)
(No Model.)
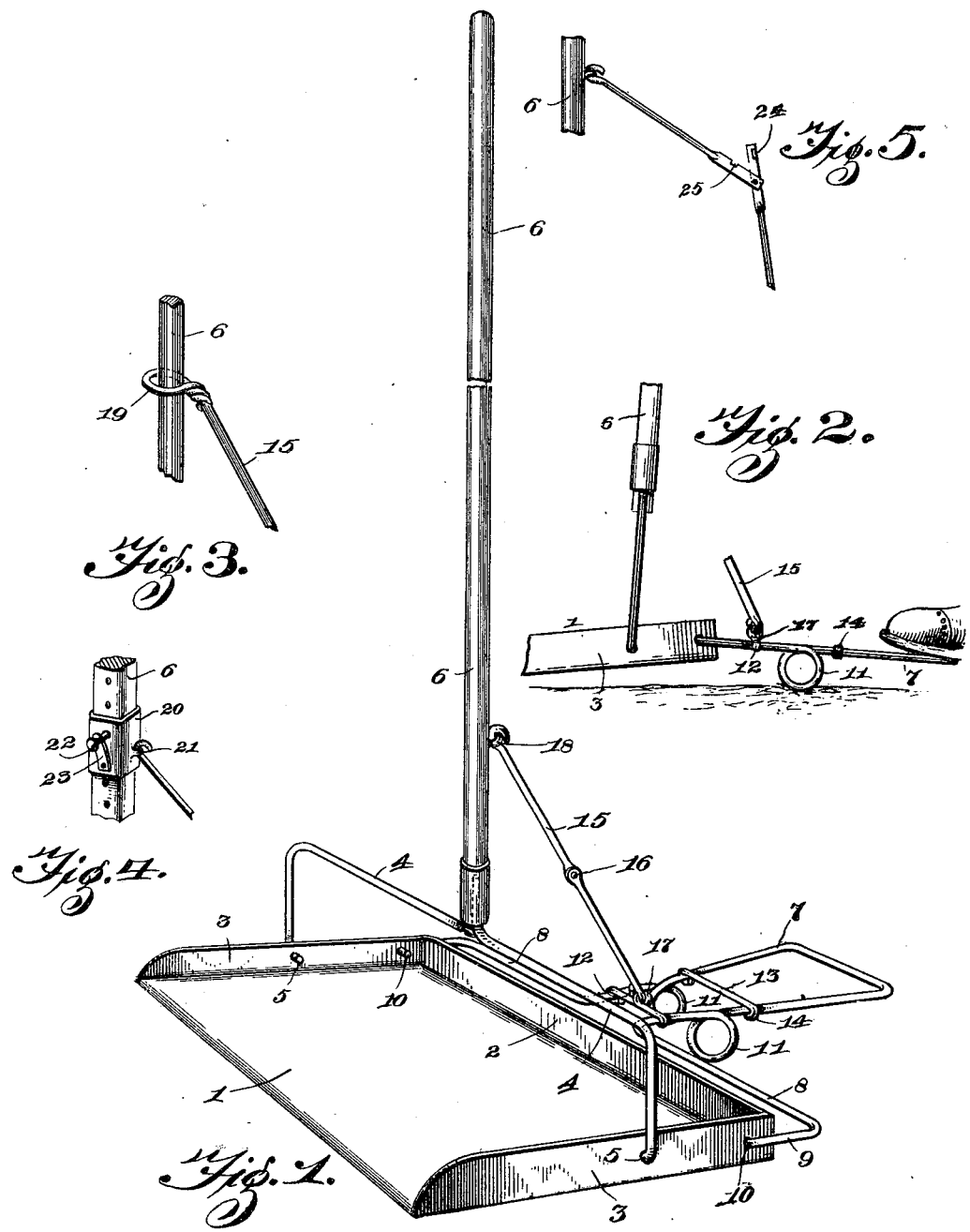

UNITED STATES PATENT OFFICE.

FRANZ FREDERICH WEILENMAN, OF HOLLISTER, CALIFORNIA, ASSIGNOR OF ONE-HALF TO N. C. BRIGGS AND L. W. JEFFERSON, OF SAN BENITO COUNTY, CALIFORNIA.

DUST-PAN.

SPECIFICATION forming part of Letters Patent No. 675,256, dated May 28, 1901.

Application filed September 27, 1900. Serial No. 31,319. (No model.)

*To all whom it may concern:*

Be it known that I, FRANZ FREDERICH WEILENMAN, a citizen of the United States, residing at Hollister, in the county of San Benito and State of California, have invented a new and useful Dust-Pan, of which the following is a specification.

This invention relates to dust-pans, and has for its object to provide an improved device of this character which does not require the user to stoop down to sweep the dirt into the pan and is arranged for convenient manipulation by the foot, while the user remains in an upright position. It is furthermore designed to provide the pan with improved means for tilting the same to facilitate the entrance of the sweepings into the mouth of the pan and to render such tilting device removable and applicable to different pans.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a dust-pan constructed and arranged in accordance with the present invention. Fig. 2 is a detail side elevation showing the operation of the tilting device. Fig. 3 is a detail view illustrating a modified form of connection for the brace between the handle of the pan and the tilting device. Fig. 4 is a detail perspective view of an adjustable connection between the brace and the handle. Fig. 5 is a detail view of the intermediate hinged joint of the brace.

Corresponding parts are designated by like characters of reference in all of the figures of the drawings.

Referring to the drawings, 1 designates an ordinary dust-pan having the upstanding back flange 2 and the opposite upstanding flanges 3, the front side of the pan being unobstructed for the reception of the sweepings. Spanning the upper side of the pan is an inverted substantially U-shaped wire bail 4, the opposite ends of which are bent laterally inward to form the pivot-pins 5, which are sprung into corresponding perforations formed in the side flanges of the pan and from the outer sides thereof. Rising from the center of this bail is a wooden handle 6 of suitable length, so that the user of the pan is not required to stoop and may remain in an upright position while sweeping into the pan, and the latter may be conveniently and effectively manipulated by means of this handle.

The means for tilting the pan upon the bail is formed from a single length of stiff wire which is bent intermediate of its ends to form a loop-shaped or substantially U-shaped foot-rest 7, the opposite ends of which are bent laterally outward in opposite directions to form the arms 8. The ends of these arms are then bent forwardly, so as to form the spring-jaws 9, and the extremities of the latter are bent laterally inward in opposite directions to form the pivots or journals 10, which are sprung into perforations formed in the rear portions of the side flanges of the pan and from the outer sides thereof, whereby the tilting device is removable. The opposite sides of the foot rest or trip are bent into the corresponding coils 11, which are located upon the under side of the device and adjacent to the lateral arms thereof and are designed to form a fulcrum-support for engagement with the floor or ground, as shown in Fig. 2 of the drawings. By placing the coils upon the floor or ground and pressing downwardly upon the outer end of the trip with the foot the pan may be tilted upon its pivotal connection with the handle-bail, so as to elevate the rear end of the pan and depress the forward end into contact with the ground or floor, whereby the pan is disposed in an inclined position to facilitate the entrance of the sweepings through the mouth thereof and is held in such position by the foot alone. The sides of the trip or foot-rest are connected by means of the front and rear braces 12 and 13, that are located in front and rear, respectively, of the fulcrum-coils 11, each brace being formed from a single piece of wire and having its opposite ends bent into hooks 14, which embrace the opposite sides of the trip, so as to strengthen and stiffen the latter.

A brace 15 extends between the wooden handle and the trip and is preferably formed in two sections, which have their inner ends pivotally or hingedly connected, as at 16, the lower end of the brace being hooked into an eye or loop 17, which is twisted in the intermediate portion of the front brace 12, while the upper end of the brace has a loose connection with the handle by being hooked into an eye or staple 18, carried by the rear side of the handle.

In some instances it may be desirable to have a slidable connection between the upper end of the brace and the handle, and this is accomplished by a loop or ring 19, as shown in Fig. 3, or by means of a sleeve 20, as shown in Fig. 4. In this latter form the handle is preferably angular and the sleeve is also angular, so as not to turn upon the handle, while the upper end of the brace is hooked into a suitable eye 21, formed upon the rear side of the sleeve. In order that the sleeve may be held at any desired adjustment upon the handle, there is provided a lateral pin 22, which extends inwardly through a perforation in one side of the sleeve, so as to bind upon the handle or take into suitable perforations or recesses therein. This pin is carried at the free end of a leaf-spring 23, which has its opposite end fixedly connected to the exterior of the sleeve, so as to normally force the pin inwardly for engagement with the handle.

The preferred form of hinge-joint for the brace is shown in Fig. 5, in which the inner ends of the brace-section are overlapped and the pivotal connection is at the end of one section, while the free end of the other section is provided with a lateral stud or projection 24, which is designed to take into a notch or recess 25, formed in the upper edge of the one section, so as to prevent the joint from breaking downwardly.

To fold the pan when the preferred form of joint for the brace is used, the rear end of the pan is swung upwardly upon its pivotal connection with the handle, thereby striking the brace and breaking the joint thereof, so that the rear edge of the pan may pass clear of the brace and fold against the rear side of the handle, after which the brace assumes its normal position and the trip is folded downwardly across the bottom of the pan, whereby the device is folded in compact form. When the slidable connection is employed between the brace and the handle, the slide is drawn upwardly, thereby swinging the trip and the rear side of the pan upwardly against the rear side of the handle, in which position they are held by means of the spring-pressed pin 22 engaging the handle.

What is claimed is—

1. The combination with a dust-pan, having opposite upstanding flanges, which are provided with corresponding perforations, of means for tilting the pan, comprising a foot-trip extending rearwardly from the pan, and provided at its forward end with oppositely-directed lateral arms, which extend across the back of the pan, and have forwardly-directed outer terminal spring-jaws, which lie at opposite sides of the pan, and have terminal inwardly-directed pivot-pins, which are detachably sprung into the respective perforations of the pan, and a floor-engaging fulcrum-support carried by the under side of the trip and located intermediate of the outer end thereof and the opposite arms.

2. A tilting attachment for dust-pans, formed from a single piece of stiff wire, which is bent intermediate of its ends into a substantially U-shaped foot-trip, the ends thereof being bent laterally outward in opposite directions into lateral arms, the ends of the latter being bent forwardly into spring-jaws, and the extremities of the jaws being bent laterally inward in opposite directions into pivots or journals, the intermediate portions of the opposite sides of the trip being bent into corresponding fulcrum-coils located upon the under side of the trip.

3. The combination with a dust-pan, of a swinging bail extending above the same, a handle rising from the bail, a tilting device pivotally connected to the back of the pan and extending rearwardly therefrom, said tilting device having a terminal foot-trip, and an intermediate fulcrum-support upon the under side thereof, and a foldable brace connecting the tilting device and the handle.

4. The combination with a dust-pan, having an upright handle pivotally or hingedly connected thereto, of a tilting device pivotally connected to the rear side of the pan, and having an intermediate floor-engaging fulcrum-support, and a foldable brace between the tilting device and the handle.

5. The combination with a dust-pan, having an upright handle pivotally or hingedly connected thereto, of a tilting device pivotally connected to the rear side of the pan, and having an intermediate floor-engaging fulcrum-support and a brace between the tilting device and the handle, and having an intermediate pivotal joint, which is breakable upwardly only.

6. The combination with a dust-pan, having an upright handle pivotally or hingedly connected thereto, of a tilting device connected to the rear side of the pan, and a brace between the tilting device and the handle, and also having a slidable connection with the latter.

7. The combination with a dust-pan, having an upright handle pivotally or hingedly connected thereto, of a tilting device connected to the rear side of the pan, and a brace between the tilting device and the handle, the upper end of the brace having a sleeve slidably embracing the handle, and provided with means for adjustably locking the sleeve upon the handle.

8. The combination with a dust-pan, having an upright handle pivotally or hingedly connected thereto, of a tilting device connected to the rear side of the pan, a brace between the tilting device and the handle, a sleeve slidable upon the handle and connected to the upper end of the brace, and a spring-pressed pin carried by the sleeve and in adjustable engagement with the handle.

9. The combination with a dust-pan, having an upright handle pivotally connected thereto, of a tilting device projecting rearwardly from the pan, and having an intermediate floor-engaging fulcrum-support, and a brace having its opposite ends pivotally connected to the handle and the tilting device.

In testimony that I claim the foregoing as my own I have hereto affixed my signature in the presence of two witnesses.

FRANZ FREDERICH WEILENMAN.

Witnesses:
JNO. L. HUDSON,
L. W. JEFFERSON.